(12) United States Patent
Mayne

(10) Patent No.: US 12,003,642 B2
(45) Date of Patent: Jun. 4, 2024

(54) SYSTEM AND METHOD FOR AUTHENTICATION USING NON-FUNGIBLE TOKENS

(71) Applicant: Stephen Mayne, Austin, TX (US)

(72) Inventor: Stephen Mayne, Austin, TX (US)

(*) Notice: Subject to any disclaimer, the term of this patent is extended or adjusted under 35 U.S.C. 154(b) by 222 days.

(21) Appl. No.: 17/507,549

(22) Filed: Oct. 21, 2021

(65) Prior Publication Data

US 2023/0128790 A1 Apr. 27, 2023

(51) Int. Cl.
| | | |
|---|---|---|
| *H04L 9/32* | (2006.01) | |
| *H04L 9/06* | (2006.01) | |
| *H04L 9/08* | (2006.01) | |
| *H04L 9/30* | (2006.01) | |
| *H04L 9/00* | (2022.01) | |

(52) U.S. Cl.
CPC .......... *H04L 9/3226* (2013.01); *H04L 9/0643* (2013.01); *H04L 9/0863* (2013.01); *H04L 9/30* (2013.01); *H04L 9/3234* (2013.01); *H04L 9/50* (2022.05)

(58) Field of Classification Search
CPC ... H04L 9/3226; H04L 9/0643; H04L 9/0863; H04L 9/30; H04L 9/3234; H04L 9/50; H04L 9/006
See application file for complete search history.

(56) References Cited

U.S. PATENT DOCUMENTS

| | | | |
|---|---|---|---|
| 6,738,903 B1* | 5/2004 | Haines | G03G 21/181 |
| | | | 705/75 |
| 11,374,756 B1* | 6/2022 | Myers | H04L 9/0819 |
| 2010/0011211 A1* | 1/2010 | Anemikos | H04L 9/3226 |
| | | | 713/168 |
| 2018/0278413 A1* | 9/2018 | Dover | H04L 9/006 |
| 2020/0111068 A1* | 4/2020 | Scarselli | G06Q 20/409 |
| 2020/0273048 A1* | 8/2020 | Andon | G06Q 20/045 |
| 2021/0248653 A1* | 8/2021 | Mckenzie | G06F 21/44 |
| 2021/0256110 A1* | 8/2021 | Guinard | G06Q 10/08 |
| 2022/0123939 A1* | 4/2022 | Guinard | G06Q 10/083 |
| 2022/0156339 A1* | 5/2022 | Grajales | G06Q 30/0623 |
| 2022/0158997 A1* | 5/2022 | Guinard | H04L 63/0853 |
| 2022/0164899 A1* | 5/2022 | Brown | G06K 19/06112 |
| 2022/0198562 A1* | 6/2022 | Cella | G06Q 40/04 |
| 2022/0222364 A1* | 7/2022 | Roberts | G06F 21/64 |
| 2022/0253868 A1* | 8/2022 | Scarselli | H04L 9/30 |
| 2022/0300950 A1* | 9/2022 | Yakovlev | G06Q 20/02 |
| 2022/0309491 A1* | 9/2022 | Shapiro | H04L 9/50 |
| 2022/0366061 A1* | 11/2022 | Spivack | H04L 9/3271 |

(Continued)

*Primary Examiner* — J. Brant Murphy
(74) *Attorney, Agent, or Firm* — Johnston IP Law, PLLC

(57) ABSTRACT

In an example, a non-transitory machine-readable storage medium includes stored instructions. The store instructions, when executed by one or more processors, cause the one or more processors to: receive a unique identifier of a tagged physical good; receive a public key stored in a Non-Fungible Token (NFT) corresponding to the unique identifier; encrypt a first passphrase using the public key to obtain an encrypted passphrase; compare a second passphrase to the first passphrase; and generate an output indication in response to comparing the second passphrase to the first passphrase. The second passphrase is generated by decrypting the encrypted passphrase using a private key stored on an electronic tag device embedded in the tagged physical good.

18 Claims, 12 Drawing Sheets

(56) References Cited

U.S. PATENT DOCUMENTS

| | | | | |
|---|---|---|---|---|
| 2022/0375013 A1* | 11/2022 | Chijik | .................. | G06Q 50/184 |
| 2023/0031817 A1* | 2/2023 | Mulas | .................. | G07G 1/0054 |
| 2023/0043223 A1* | 2/2023 | Jakobsson | ............... | G06F 21/44 |
| 2023/0085677 A1* | 3/2023 | Copeland | ........... | G06Q 20/4015 |
| | | | | 705/66 |
| 2023/0169154 A1* | 6/2023 | Chua | ...................... | G06Q 20/42 |
| | | | | 726/26 |
| 2023/0173395 A1* | 6/2023 | Cella | .................. | G06Q 20/401 |
| | | | | 463/25 |

* cited by examiner

| Field Name | Data Type |
|---|---|
| Name | String |
| Symbol | String |
| Owner | uint 256 |
| RSA Public Key | String |
| Serial Number | String |
| Description | String |
| Image URL | String |
| Token URI | json |

```
{
"name": "SMYNE893426",
"description": "Black Fashion Backpack With Laptop Holder",
"serial number": "89F51IOPKDJ8966"
"image":
"http://ipfs.io/ipfs/jfJDKjkl/example#/ipfs/JowBmlL",
"RSA Public Key": "00 00 00 00 07 73 73 68 2d
72 73 61 00 00 00 00 01 25 00 00 00 01 00 7f 9c
09...6d be 8c 62 31 a9 9b 60 5a 0e e5 4f 2d e6
5f 2e 71 f3 7e 92 8f fe 8b"
}
```

FIG. 6

SYSTEM AND METHOD FOR AUTHENTICATION USING NON-FUNGIBLE TOKENS

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

Non-fungible tokens (NFTs) are part of an emerging digital technology. NFTs are generally a unique and non-interchangeable unit of data stored on a digital ledger, such as in blockchain. NFTs can be easily reproduced and stored in a distributed arrangement across a network, such as the Internet.

SUMMARY

According to an example, a non-transitory machine-readable storage medium includes stored instructions. The store instructions, when executed by one or more processors, cause the one or more processors to: receive a unique identifier of a tagged physical good; receive a public key stored in a Non-Fungible Token (NFT) corresponding to the unique identifier; encrypt a first passphrase using the public key to obtain an encrypted passphrase; compare a second passphrase to the first passphrase; and generate an output indication in response to comparing the second passphrase to the first passphrase. The second passphrase is generated by decrypting the encrypted passphrase using a private key stored on an electronic tag device embedded in the tagged physical good.

According to another example, a physical good includes an electronic tag device and an inductive coupling power source. The electronic tag device includes one or more processors and non-transitory memory. The non-transitory memory includes stored instructions. The stored instructions, when executed by the one or more processors, cause the one or more processors to: receive a request for a decrypted passphrase, the request including an encrypted passphrase; decrypt the encrypted passphrase using a private key to obtain the decrypted passphrase, the private key being stored in the non-transitory memory; and cause a response including the decrypted passphrase to be transmitted.

Another example is a method for authentication. The method includes: by a first processor-based system, receiving a public key stored in a Non-Fungible Token (NFT) corresponding to a unique identifier of a physical good; by the first processor-based system, encrypting a first passphrase using the public key to obtain an encrypted passphrase; by a second processor-based system, decrypting the encrypted passphrase, to obtain a second passphrase, using a private key stored embedded in the physical good; by the first processor-based system, comparing the first passphrase to the second passphrase; and by the first processor-based system, generating an output indication in response to comparing the second passphrase to the first passphrase.

According to another example, a non-transitory machine-readable storage medium includes stored instructions. The store instructions, when executed by one or more processors, cause the one or more processors to: generate a cryptographic key for a physical good; cause a Non-Fungible Token (NFT) corresponding to a unique identifier of the physical good to be minted; and encode an electronic tag device with the cryptographic key, the electronic tag device to be embedded in the physical good.

DESCRIPTION OF THE DRAWINGS

Illustrative examples are described in detail below with reference to the attached drawing figures, which are incorporated by reference herein and wherein:

FIG. 6 shows the format of an example NFT according to the Ethereum Request for Comments 721 (ERC721) according to some examples.

DETAILED DESCRIPTION

Figure 1:
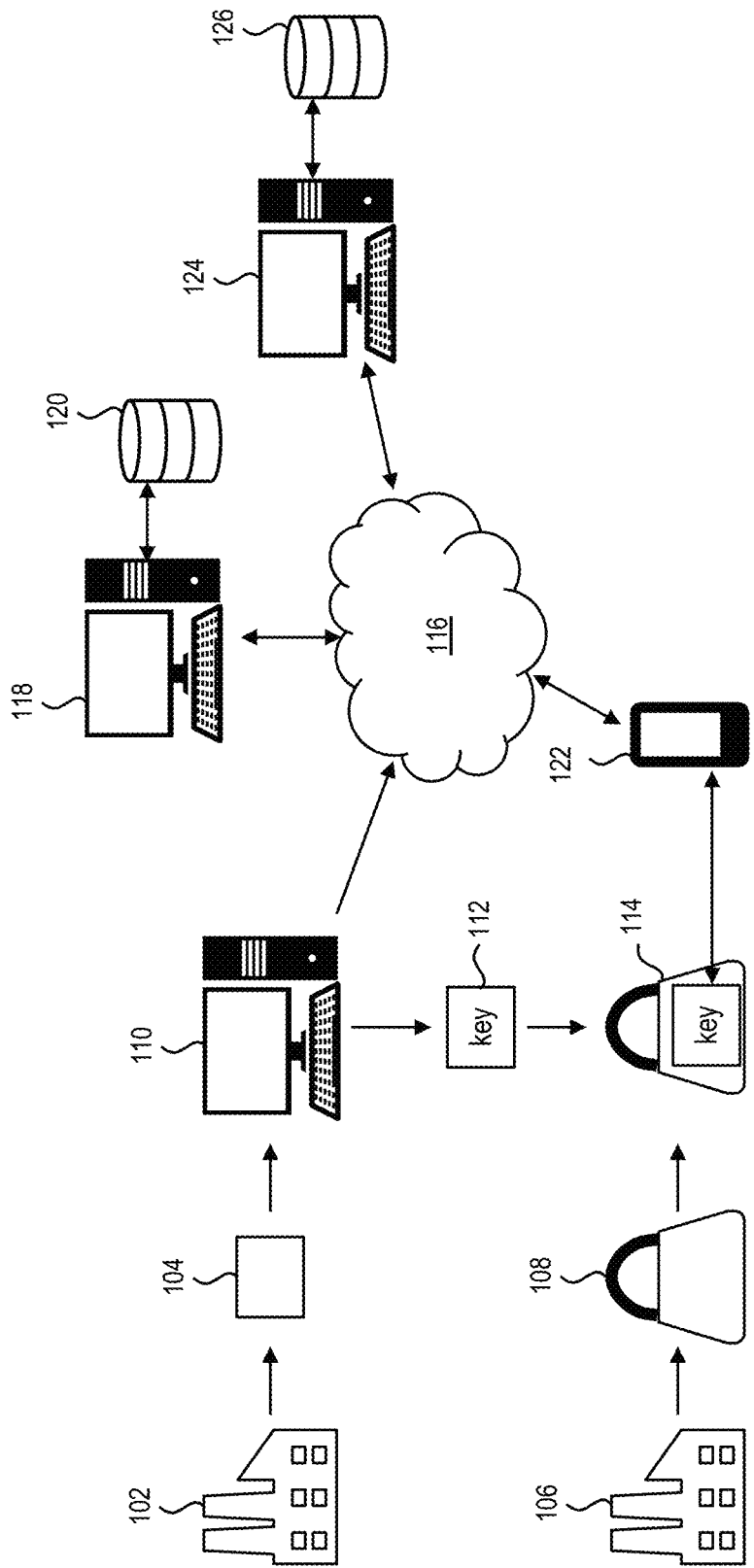
FIG. 1 is an example environment for authentication using a Non-Fungible Token (NFT) according to some examples.

In the following detailed description of the preferred embodiments, reference is made to the accompanying drawings that form a part hereof, and in which is shown, by way of illustration, specific embodiments in which subject matter claimed herein may be practiced. These embodiments are described in sufficient detail to enable those skilled in the art to practice the subject matter claimed herein, and it is understood that other embodiments may be utilized and that logical structural, mechanical, and electrical changes may be made without departing from the spirit or scope of the claimed subject matter. To avoid detail not necessary to enable those skilled in the art to practice the claimed subject matter, the description may omit certain information known to those skilled in the art. The following detailed description is, therefore, not to be taken in a limiting sense.

Unless otherwise indicated, as used throughout this document, "or" does not require mutual exclusivity. Further, methods described herein may be described in a particular order of operations or functionality, but other methods according to other examples may be implemented in various other orders (e.g., including different serial or parallel performance of various operations or functionality) with more or fewer operations or functionality.

Counterfeit goods can dupe consumers into purchasing goods that the consumer believes are produced by a particular entity but in fact are not. Counterfeit goods are usually produced to appear to be the authentic goods to use the name and trade dress of a well-known manufacturer to benefit monetarily, while the counterfeit goods usually are not produced at the same level of quality as the authentic goods. Counterfeit goods therefore can harm the name and trade dress of the original manufacturer and can harm consumers by the consumers unwittingly paying more or expecting a higher quality of product than the consumers actually purchase.

Emerging digital technologies can enable easily authenticating a product. Non-Fungible Tokens (NFTs) have been developed and can be used to store data in a network in a distributed, secure manner. Examples described herein implement NFTs to be associated with corresponding physical goods. An NFT can store data corresponding to a physical good that is used to authenticate the physical good. Cryptography coupled with the NFT is further used to mathematically link a physical good with an NFT to authenticate a physical good. Hence, the emerging technology of NFTs with cryptography can provide a technical solution to authentication of goods.

The technology of NFTs with cryptography may also provide a deterrent for theft. Ownership of the NFT and the linked physical good may be needed for establishing authenticity and valid ownership of an item. For this reason, possessing a physical good without the linked NFT would may result in a sizeable loss in value. This can discourage potential thieves from attempting to steal linked items from individuals or organizations.

FIG. 1 illustrates an example environment for authentication using an NFT according to some examples. FIG. 1 shows a semiconductor fabrication facility 102 that fabricates and packages an electronic tag device 104. In some examples, the electronic tag device 104 can be or include one or more integrated circuits on respective semiconductor dies. The one or more integrated circuits may be disposed in an electronic package. In some examples, the electronic tag device 104 can be a passive device that, e.g., can be scanned or read for data. In some examples, the electronic tag device 104 can be or include an active device that is capable of processing data, such as decrypting data. In examples where the electronic tag device 104 is capable of processing data, the electronic tag device 104 can be or include a processor-based system, which can be powered by a wireless power supply (e.g., an inductively coupled power supply). The electronic tag device 104 can include circuitry that is compliant with any appropriate proximity communication techniques, such as passive ultra-high frequency radio frequency identification (UF-RFID), near field communication (NFC), or the like. A goods production facility 106 produces a physical good 108. Examples of the electronic tag device 104 include a RFID tag, an NFC chip, a SmartCard, an inductively powered processor, the like, or a combination thereof.

A processor-based system 110 (e.g., one or more computers) has cryptography functionality. The processor-based system 110 is configured to generate a cryptographic key or a cryptographic key pair. For example, the processor-based system 110 can generate a cryptographic key pair (e.g., an asymmetric key pair) according to the Public Key Infrastructure (PKI) and Rivest-Shamir-Adelman (RSA) encryption. As another example, the processor-based system 110 can generate a cryptographic key according to the Advanced Encryption Standard (AES). The processor-based system 110 is further configured to encode the electronic tag device 104 with the cryptographic key or one key (e.g. the private key) of the cryptographic key pair to obtain an encoded electronic tag device 112. The encoded electronic tag device 112 is embedded in the physical good 108 to obtain a tagged physical good 114.

The processor-based system 110 is further configured cause an NFT associated with the tagged physical good 114 to be minted. The NFT can be compliant with any appropriate format, such as Ethereum Request for Comments 721 (ERC721), Ethereum Request for Comments 1155 (ERC1155), or the like. Information about the tagged physical good 114 is stored as metadata in the NFT. For example, a unique identifier (e.g., the serial number) of the tagged physical good 114 is stored as metadata in the NFT. In some examples, a public cryptographic key is stored as metadata in the NFT.

The processor-based system 110 communicates, via a network 116, the NFT to a processor-based system 118 (e.g., a computer, server, etc.), and the processor-based system 118 stores and maintains the NFT in a database 120 as a node on a ledger (e.g., blockchain). The network 116 can be or include a Local Area Network (LAN), Wide Area Network (WAN), the Internet, or a combination thereof, and may be or include wired and/or wireless technologies. The NFT stored in the database 120 is publicly viewable to any entity. In some instances, an entity may deploy its own private blockchain. In such examples, the private blockchain may be implemented rather than the public blockchain.

User equipment (UE) 122 is communicatively coupled (e.g., wirelessly) to the network 116. The UE 122 is also a processor-based system 110. The UE 122 includes proximity-based communication circuitry, such as an RFID reader, NFC scanner, or the like that can be communicatively and/or inductively coupled to the encoded electronic tag device 112 embedded in the tagged physical good 114. The UE 122 also includes an input device (e.g., a touch screen, button(s), etc.) that allows a user of the UE 122 to input information. The UE 122 is configured to communicate with the encoded electronic tag device 112 embedded in the tagged physical good 114 to obtain the cryptographic key encoded on the encoded electronic tag device 112 and, by user input, to obtain a unique identifier (e.g., the serial number) of the tagged physical good 114. As detailed in examples below, the UE 122 is configured to access, via the network 116, the NFT stored on the database 120 using the unique identifier and is configured to authenticate the tagged physical good 114 using information provided by the NFT and using the cryptographic key stored on the encoded electronic tag device 112.

Some examples also implement a processor-based system 124 (e.g., a computer, server, etc.) that is communicatively coupled to the network 116. In such examples, the processor-based system 110 communicates, via a network 116, a cryptographic key and the corresponding unique identifier of the tagged physical good 114 to the processor-based system 124, and the processor-based system 124 stores and maintains the cryptographic key and identifying information in a database 126. The processor-based system 124 and database 126 can be implemented when a private key cryptography (e.g., symmetric cryptography) is implemented.

The processor-based systems 110, 118, 124 are shown as an example. In some examples, any number of processor-based systems can implement the functionality of one or more of the processor-based systems 110, 118, 124. Some functionality can be in a centralized processor-based system, while other functionality can be distributed through multiple processor-based systems, for example.

Functionality of a processor-based system described herein can be embodied as instructions (e.g., machine code) stored in a non-transitory machine-readable storage medium (e.g., read-only memory (ROM), random access memory (RAM), flash memory, or the like). The functionality can be performed by one or more processors of the respective processor-based system executing the instructions. A cryptographic generation module embodied as instructions stored in a non-transitory machine-readable storage medium on the processor-based system 110 can be executed by one or more processors of the processor-based system 110 to perform functionality described as being performed by the processor-based system 110. An NFT minting and maintenance services module embodied as instructions stored in a non-transitory machine-readable storage medium on the processor-based system 118 can be executed by one or more processors of the processor-based system 118 to perform functionality described as being performed by the processor-based system 118. A secure database maintenance and remote authentication services module embodied as instructions stored in a non-transitory machine-readable storage medium on the processor-based system 124 can be executed by one or more processors of the processor-based system 124 to perform functionality described as being performed by the processor-based system 124. A local authentication services module embodied as instructions stored in a non-transitory machine-readable storage medium on the UE 122 (e.g., a processor-based system) can be executed by one or more processors of the UE 122 to perform functionality described as being performed by the UE 122. When the encoded electronic tag device 112 is a processor-based system, a good authentication services module embodied as instructions stored in a non-transitory machine-readable storage medium on the encoded electronic tag device 112 can be executed by one or more processors of the encoded electronic tag device 112 to perform functionality described as being performed by the encoded electronic tag device 112. Additional details of example processor-based systems are described below.

Figure 2:
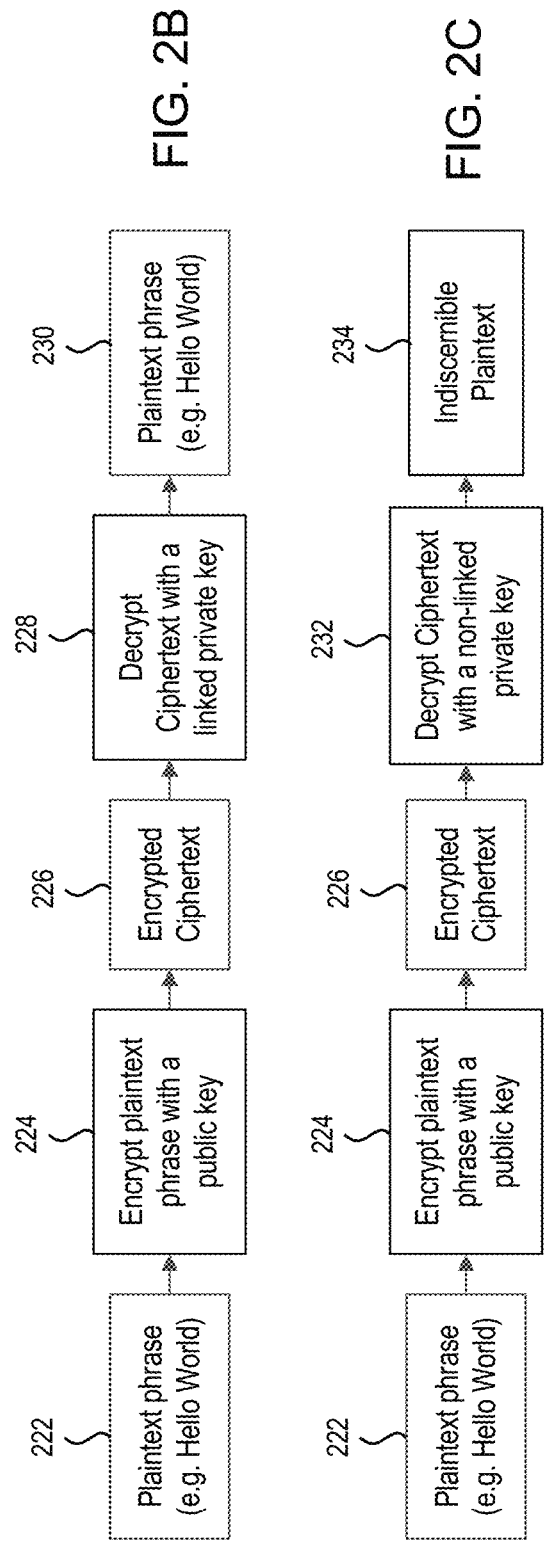
FIGS. 2A, 2B, and 2C illustrate some general concepts of public key cryptography.

FIGS. 2A, 2B, and 2C illustrate some general concepts of public key cryptography. Public-key cryptography can also be referred to as asymmetric cryptography or public key infrastructure (PKI). As shown in FIG. 2A, in public-key cryptography. asymmetric key-pair generation (at block 202) results in a public key 204 and a private key 206. The RSA algorithm is an example algorithm to generate a public-private key pair. The public key 204 and private key 206 are mathematically linked to enable encrypted communications. Use of a linked pair of public key and private key enables encryption and proper decryption, whereas if a non-linked public key and private key are used, proper decryption generally cannot be accomplished.

FIG. 2B shows how proper decryption can be accomplished using a linked pair of public key and private key. At block 222, a plaintext phrase (e.g., "Hello World") is generated. At block 224, the plaintext phrase is encrypted with a public key to obtain, at block 226, encrypted ciphertext. At block 228, the ciphertext is decrypted using a mathematically linked private key, which results in obtaining, at block 230, the original plaintext phrase (e.g., "Hello World") from block 222. In contrast, FIG. 2C shows results of decryption when using a non-linked pair (e.g., improper pair) of public key and private key. In FIG. 2C, blocks 222-226 are performed to obtain the encrypted ciphertext. At block 232, the ciphertext is decrypted using a non-linked (e.g., improper) private key, which results in obtaining, at block 234, likely indiscernible or unintelligible plaintext.

Private key cryptography operates similarly to public key cryptography in some respects. Private key cryptography can also be referred to as symmetric cryptography. In private key cryptography, a private key is generated. The private key is used to both encrypt and to decrypt. If two entities possess a private key, for example, the two parties can communicate with each other by encrypting messages to be sent using the private key and by decrypting received encrypted messages using the same private key.

Figure 3:
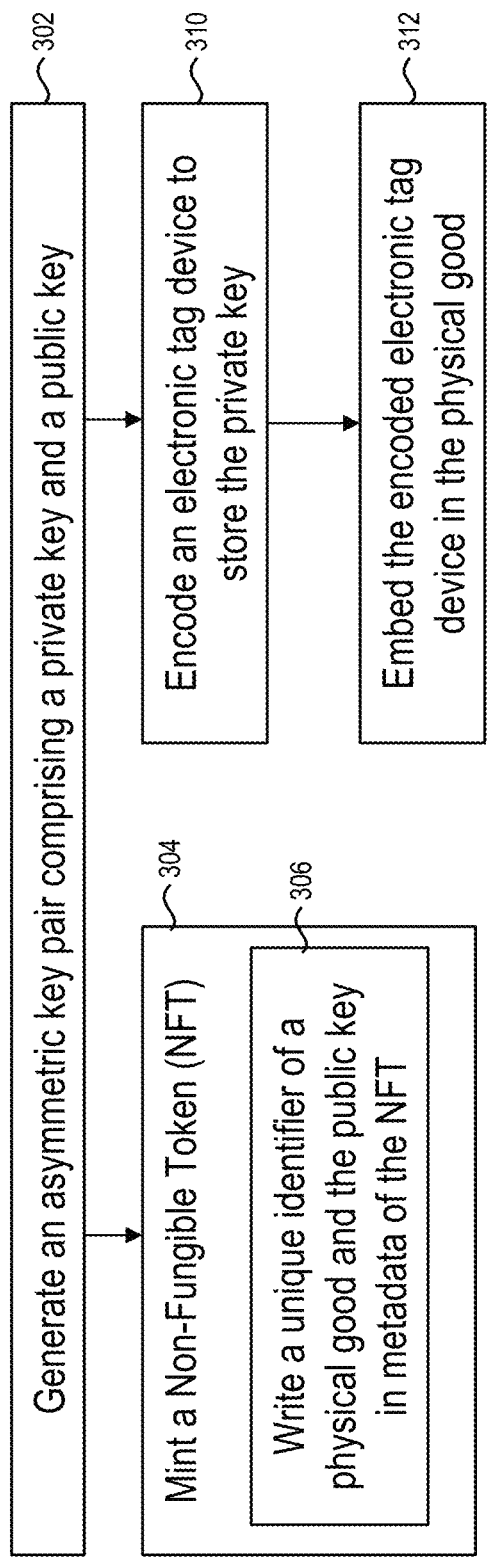
FIG. 3 is a method for pairing a tagged physical good with an NFT according to some examples.

FIG. 3 is a method for pairing a tagged physical good with an NFT according to some examples. The method of FIG. 3 implements public-key cryptography. At block 302, an asymmetric key pair (comprising a private key and a public key) is generated for a physical good 108. The generation of the asymmetric key pair can be according to the RSA algorithm, as an example. At block 304, an NFT is minted. Minting an NFT includes creating a block of data on a digital ledger (e.g., blockchain) in a database 120. The NFT can be stored according to ERC721, for example. In the process of minting the NFT, at block 306, a unique identifier of the physical good 108 and the public key are written in metadata of the NFT. At block 310, an electronic tag device 104 is encoded to store the private key to create an encoded electronic tag device 112. At block 312, the encoded electronic tag device 112 is embedded in the physical good 108 to obtain the tagged physical good 114.

The functionality of blocks 302, 310—generating the asymmetric key pair and encoding the electronic tag device 104—can be performed by the processor-based system 110 (e.g., a cryptographic generation module). The functionality of block 304—minting the NFT—can be performed by the processor-based system 110 (e.g., the cryptographic generation module), the processor-based system 118 (e.g., an NFT minting and maintenance services module), or the processor-based systems 110, 118 together.

Figure 4:
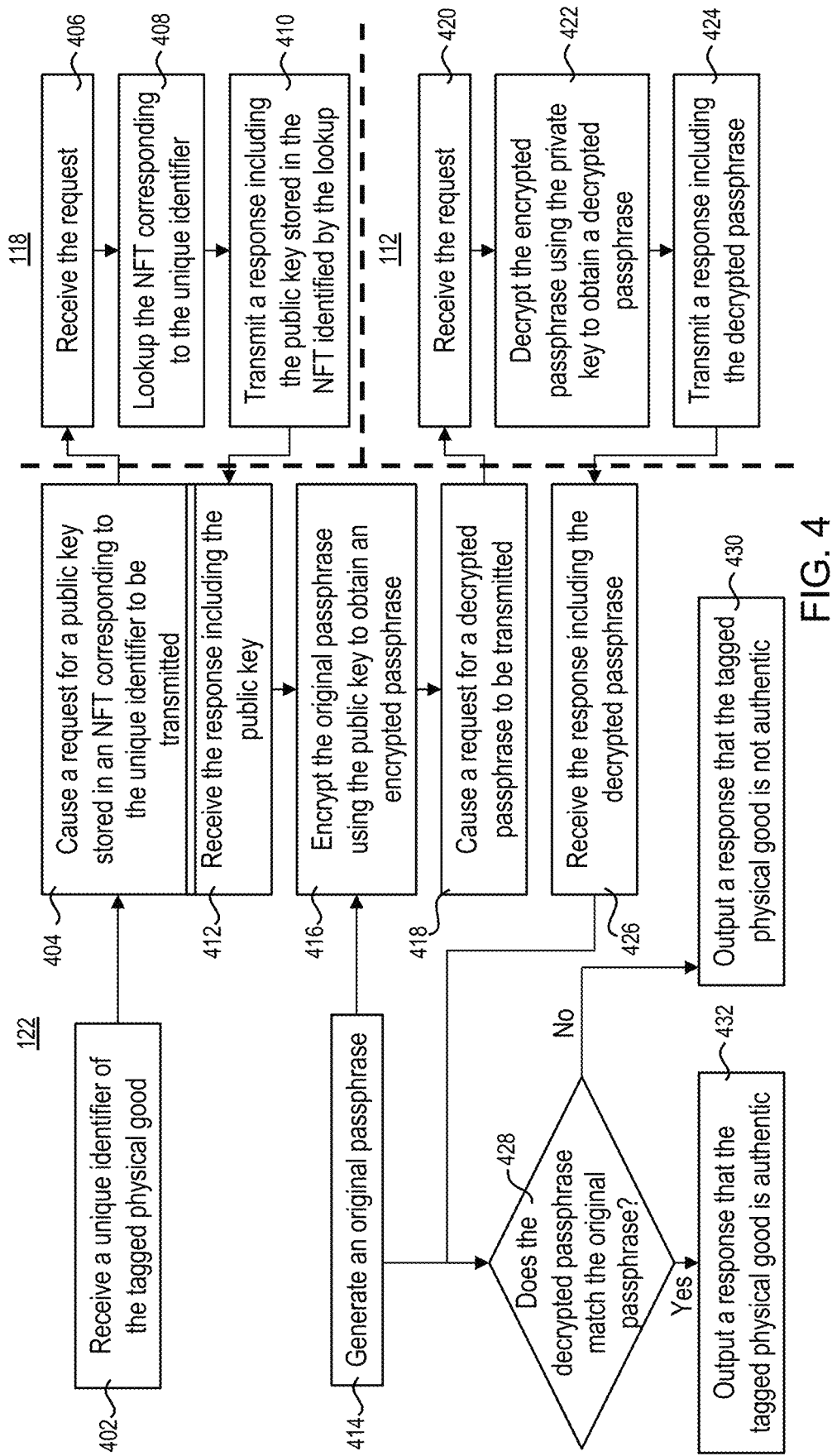
FIG. 4 is a method for authenticating a tagged physical good according to some examples.

FIG. 4 is a method for authenticating a tagged physical good according to some examples. The method of FIG. 4 implements public-key cryptography. The method of FIG. 4 indicates functionality performed by the UE 122 (e.g., a local authentication services module), functionality performed by the processor-based system 118 (e.g., an NFT minting and maintenance services module), and functionality performed by the encoded electronic tag device 112 (e.g., a good authentication services module). Each module can be instructions stored on a respective non-transitory machine-readable storage medium in the respective system, and one or more processors of the respective system execute the instructions of the module to effectuate the functionality described with respect to the respective system in FIG. 4.

At block 402, a unique identifier of the tagged physical good 114 is received. The unique identifier can be received by the local authentication services module from an input/output device, such as a touchscreen, button(s), or the like, of the UE 122. For example, the local authentication services module can initiate a user interface on a touchscreen of the UE 122 to prompt a user to input the unique identifier by using a graphical keyboard displayed on the touchscreen. In some examples, the unique identifier is or includes a serial number of the tagged physical good 114.

At block 404, a request for a public key stored in an NFT corresponding to the unique identifier is caused to be transmitted. For example, the local authentication services module can create one or more packets for transmission to the processor-based system 118, and communication circuitry, such as for communicating wirelessly by cellular network, Wi-Fi®, or the like, of the UE 122 transmits the one or more packets via the network 116 to the processor-based system 118. The request includes the unique identifier of the tagged physical good 114.

At the processor-based system 118, at block 406, the request is received, and at block 408, the NFT corresponding to the unique identifier of the request is looked-up. The processor-based system 118 can query the database 120 using the unique identifier to lookup the corresponding NFT that was minted to or stored in that database 120. The processor-based system 118 further accesses the metadata of that NFT, particularly, the public key stored in the metadata of that NFT. At block 410, a response including the public key stored in the NFT identified by the lookup is transmitted. The processor-based system 118 can cause one or more packets that include the public key to be transmitted via the network 116 to the UE 122.

At the UE 122, at block 416, the response including the public key is received. For example, the local authentication services module can receive the one or more packets transmitted by the processor-based system 118 from the communication circuitry, such as for communicating wirelessly by cellular network, Wi-Fi®, or the like, of the UE 122.

At block 414, an original passphrase is generated. In some examples, the original passphrase can be a random string of characters or numbers. In some examples, the response received at block 414 can include the metadata of the NFT, and generating the passphrase can include inputting the metadata or randomized data based on the metadata into a hash function that generates the original passphrase. In some examples, the original passphrase can be a predetermined phrase. In some examples, a randomization technique or function is implemented to randomize data of the metadata, which randomized data is input into a hash function to obtain the original passphrase. Other techniques for generating a passphrase can be implemented.

At block 416, the original passphrase is encrypted using the public key (received at block 412) to obtain an encrypted passphrase. If the RSA algorithm was used to generate the public key, RSA encryption can be used to encrypt the original passphrase.

At block 418, a request for a decrypted passphrase is caused to be transmitted. For example, the local authentication services module can create one or more packets for transmission to the encoded electronic tag device 112, and communication circuitry, such as for communicating wirelessly by NFC or the like, of the UE 122 transmits the one or more packets to the encoded electronic tag device 112. The request includes the encrypted passphrase that was encrypted at block 416.

At the encoded electronic tag device 112, at block 420, the request is received, and at block 422, the encrypted passphrase is decrypted using the private key to obtain a decrypted passphrase. The encoded electronic tag device 112 can receive the request that contains the encrypted passphrase and decrypt the encrypted passphrase using the private key encoded in the encoded electronic tag device 112. At block 424, a response including the decrypted passphrase is transmitted. The encoded electronic tag device 112 can cause one or more packets that include the decrypted passphrase to be transmitted via, e.g., NFC to the UE 122. During the receiving, decrypting, and transmitting of blocks 420-424, the encoded electronic tag device 112 can have a wireless power supply that is, e.g., inductively coupled to the UE 122 (e.g., to the circuitry of the UE 122 communicating with the encoded electronic tag device 112) to power operations of the encoded electronic tag device 112.

At the UE 122, at block 426, the response including the decrypted passphrase is received. For example, the local authentication services module can receive the one or more packets transmitted by the encoded electronic tag device 112 from the communication circuitry, such as for communicating wirelessly by NFC or the like, of the UE 122.

At block 428, a determination whether the decrypted passphrase matches the original passphrase is made. If the decrypted and original passphrases do not match, at block 430, a response that the tagged physical good 114 is not authentic is output, and if the decrypted and original passphrases match, at block 432, a response that the tagged physical good 114 is authentic is output. The response can be output from the local authentication services module to an input/output device, such as a touchscreen or the like, of the UE 122 to inform the user of the UE 122 of the authenticity of the tagged physical good 114.

As indicated by FIGS. 2B and 2C, when an original passphrase (like the plaintext phrase of block 222) is encrypted with a public key and then decrypted with a private key, if the resulting decrypted passphrase matches (like the plaintext phrase of block 230), then a mathematically linked key-pair was used, and if the resulting decrypted passphrase does not match (like the indiscernible plaintext of block 234), then the public and private keys are not a mathematically linked key-pair. The mathematically linked key-pair is the indication that the tagged physical good 114 is paired with the NFT and is therefore authentic. Otherwise, if the key-pair is not mathematically linked, the tagged physical good 114 was not paired with the NFT and is therefore not authentic.

Figure 5:
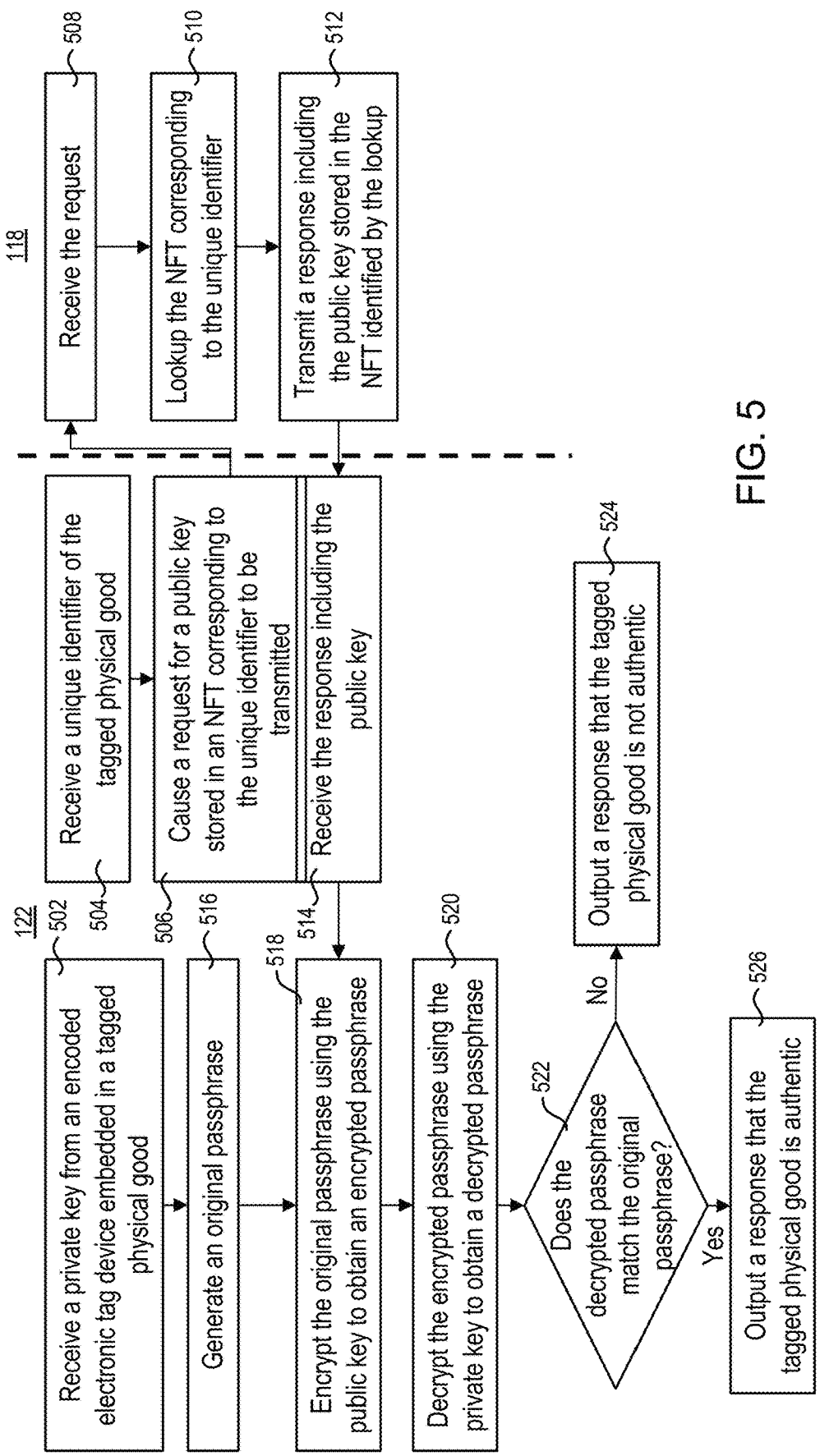
FIG. 5 is a method for authenticating a tagged physical good according to some examples.

FIG. 5 is a method for authenticating a tagged physical good according to some examples. The method of FIG. 5 indicates functionality performed by the UE 122 (e.g., a local authentication services module) and functionality performed by the processor-based system 118 (e.g., an NFT minting and maintenance services module). Each module can be instructions stored on a respective non-transitory machine-readable storage medium in the respective system, and one or more processors of the respective system execute the instructions of the module to effectuate the functionality described with respect to the respective system in FIG. 5.

At block 502, a private key is received from an encoded electronic tag device 112 embedded in a tagged physical good 114. The private key can be received by the local authentication services module from proximity-based communication circuitry, such as an RFID reader, NFC scanner, or the like, in the UE 122. The proximity-based communication circuitry of the UE 122 can be placed in sufficient proximity to the encoded electronic tag device 112 embedded in the tagged physical good 114 to scan or read the private key from the encoded electronic tag device 112.

At block 504, a unique identifier of the tagged physical good 114 is received. The unique identifier can be received by the local authentication services module from an input/output device, such as a touchscreen, button(s), or the like, of the UE 122. For example, the local authentication services module can initiate a user interface on a touchscreen of the UE 122 to prompt a user to input the unique identifier by using a graphical keyboard displayed on the touchscreen. In some examples, the unique identifier is or includes a serial number of the tagged physical good 114.

At block 506, a request for a public key stored in an NFT corresponding to the unique identifier is caused to be transmitted. For example, the local authentication services module can create one or more packets for transmission to the processor-based system 118, and communication circuitry, such as for communicating wirelessly by cellular network, Wi-Fi®, or the like, of the UE 122 transmits the one or more packets via the network 116 to the processor-based system 118. The request includes the unique identifier of the tagged physical good 114.

At the processor-based system 118, at block 508, the request is received, and at block 510, the NFT corresponding to the unique identifier of the request is looked-up. The processor-based system 118 can query the database 120 using the unique identifier to lookup the corresponding NFT that was minted to or stored in that database 120. The processor-based system 118 further accesses the metadata of that NFT, particularly, the public key stored in the metadata of that NFT. At block 512, a response including the public key stored in the NFT identified by the lookup is transmitted. The processor-based system 118 can cause one or more packets that include the public key to be transmitted via the network 116 to the UE 122.

At the UE 122, at block 514, the response including the public key is received. For example, the local authentication services module can receive the one or more packets transmitted by the processor-based system 118 from the communication circuitry, such as for communicating wirelessly by cellular network, Wi-Fi®, or the like, of the UE 122.

At block 516, an original passphrase is generated. In some examples, the original passphrase can be a random string of characters or numbers. In some examples, the response received at block 514 can include the metadata of the NFT, and generating the passphrase can include inputting the metadata into a hash function that generates the original passphrase. In some examples, the original passphrase can be a predetermined phrase. Other techniques for generating a passphrase can be implemented.

At block 518, the original passphrase is encrypted using the public key (received at block 514) to obtain an encrypted passphrase. If the RSA algorithm was used to generate the public key, RSA encryption can be used to encrypt the original passphrase. At block 520, the encrypted passphrase is decrypted using the private key (received at block 502) to obtain a decrypted passphrase. At block 522, a determination whether the decrypted passphrase matches the original passphrase is made. If the decrypted and original passphrases do not match, at block 524, a response that the tagged physical good 114 is not authentic is output, and if the decrypted and original passphrases match, at block 526, a response that the tagged physical good 114 is authentic is output. The response can be output from the local authentication services module to an input/output device, such as a touchscreen or the like, of the UE 122 to inform the user of the UE 122 of the authenticity of the tagged physical good 114.

FIG. 6 illustrates the format of an example NFT according to the ERC721 according to some examples. FIG. 6 shows the fields of the format and the data type of each field. ERC721 states what minimum fields are included to comply with ERC721, and allows for other fields to be included. As such, this example contains some fields that are not required by ERC721, but are included for implementation with various examples. A person having ordinary skill in the relevant art will readily understand this format, and hence, detailed description is omitted here for brevity. FIG. 6 further illustrates an example NFT implementing this format. Particularly, the NFT includes a token Uniform Resource Identifier (URI) in a JavaScript Object Notation (JSON). The JSON includes a serial number (which can be the unique identifier) and a description, among other information. The JSON can also duplicate information stored in other fields, such as the name, image URL, and RSA public key. The JSON can be returned by the processor-based system 118 as the response in block 512.

Figure 7:
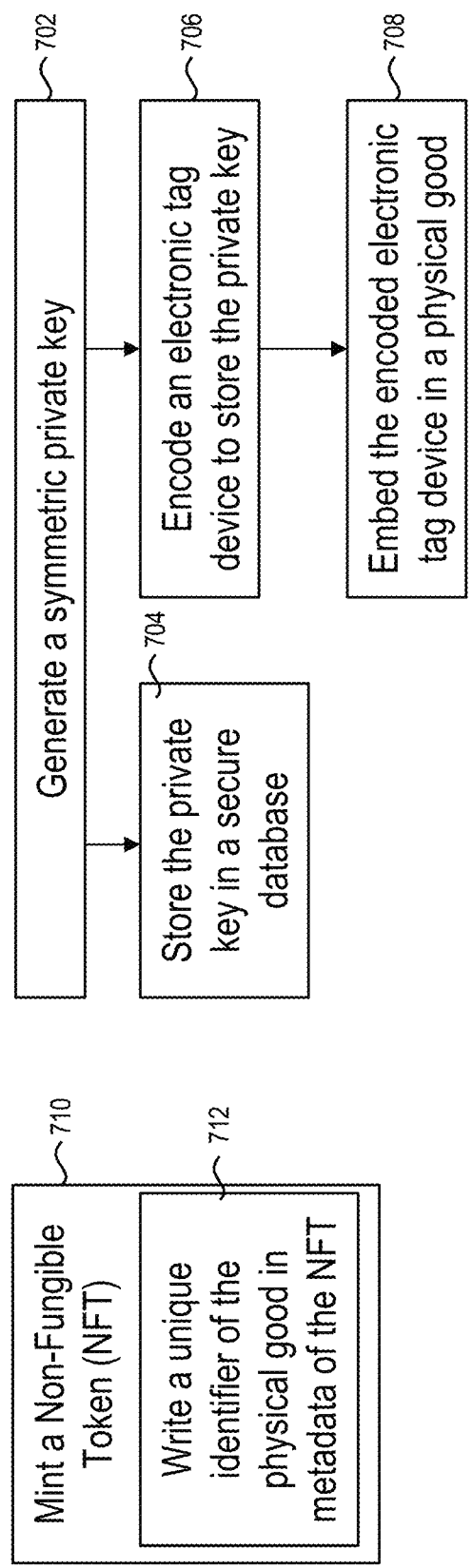
FIG. 7 is a method for pairing a tagged physical good with an NFT according to some examples.

FIG. 7 is a method for pairing a tagged physical good with an NFT according to some examples. The method of FIG. 7 implements private-key cryptography. At block 702, a symmetric private key is generated for a physical good 108. The generation of the symmetric private key can be according to the AES algorithm, as an example. At block 704, the private key is stored in a secure database. For example, the private key can be stored in the database 126 by the processor-based system 124, and can be looked up using a unique identifier of the tagged physical good. At block 706, an electronic tag device 104 is encoded to store the private key to create an encoded electronic tag device 112. At block 708, the encoded electronic tag device 112 is embedded in the physical good 108 to obtain the tagged physical good 114. At block 710, an NFT is minted. Minting an NFT includes creating a block of data on a digital ledger (e.g., blockchain) in a database 120. The NFT can be stored according to ERC721, for example. In the process of minting the NFT, at block 712, a unique identifier of the physical good 108 is written in metadata of the NFT.

The functionality of blocks 702, 706—generating the symmetric private key and encoding the electronic tag device 104—can be performed by the processor-based system 110 (e.g., a cryptographic generation module). The functionality of block 710—minting the NFT—can be performed by the processor-based system 110 (e.g., the cryptographic generation module), the processor-based system 118 (e.g., an NFT minting and maintenance services module), or the processor-based systems 110, 118 together. The functionality of block 704—minting the NFT—can be performed by the processor-based system 110 (e.g., the cryptographic generation module), the processor-based system 124 (e.g., a secure database maintenance and remote authentication services module), or the processor-based systems 110, 124 together.

Figure 8A:
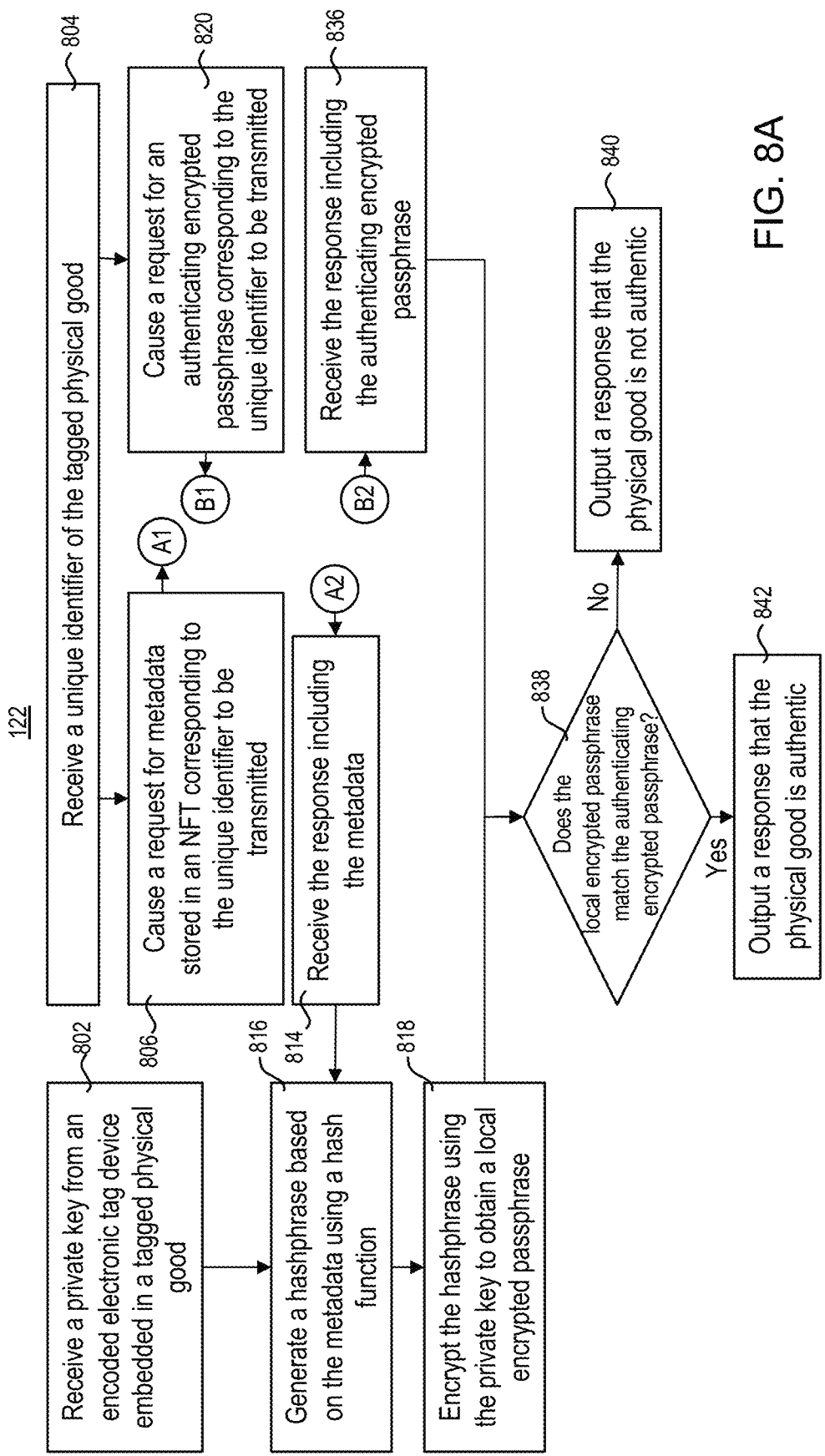
FIGS. 8A and 8B are a method for authenticating a tagged physical good according to some examples.
Figure 8B:
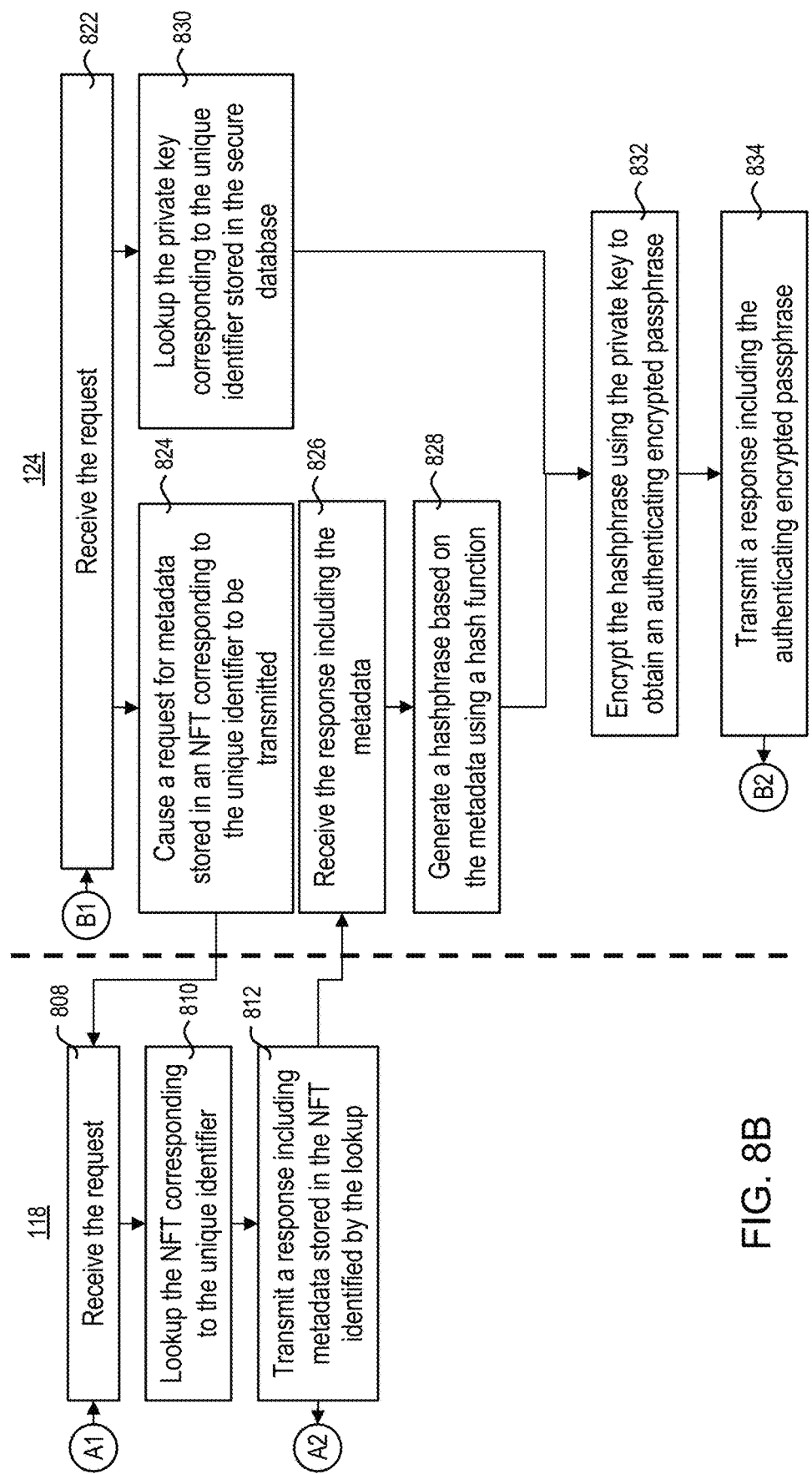

FIGS. 8A and 8B are a method for authenticating a tagged physical good according to some examples. The method of FIGS. 8A and 8B implements private-key cryptography. The method of FIGS. 8A and 8B indicates functionality performed by the UE 122 (e.g., a local authentication services module), functionality performed by the processor-based system 118 (e.g., an NFT minting and maintenance services module), and functionality performed by the processor-based system 124 (e.g., a secure database maintenance and remote authentication services module). Each module can be instructions stored on a respective non-transitory machine-readable storage medium in the respective system, and one or more processors of the respective system execute the instructions of the module to effectuate the functionality described with respect to the respective system in FIGS. 8A and 8B.

Referring to FIG. 8A, at block 802, a private key is received from an encoded electronic tag device 112 embedded in a tagged physical good 114. The private key can be received by the local authentication services module from proximity-based communication circuitry, such as an RFID reader, NFC scanner, or the like, in the UE 122. The proximity-based communication circuitry of the UE 122 can be placed in sufficient proximity to the encoded electronic tag device 112 embedded in the tagged physical good 114 to scan or read the private key from the encoded electronic tag device 112.

At block 804, a unique identifier of the tagged physical good 114 is received. The unique identifier can be received by the local authentication services module from an input/output device, such as a touchscreen, button(s), or the like, of the UE 122. For example, the local authentication services module can initiate a user interface on a touchscreen of the UE 122 to prompt a user to input the unique identifier by using a graphical keyboard displayed on the touchscreen. In some examples, the unique identifier is or includes a serial number of the tagged physical good 114.

At block 806, a request for metadata stored in an NFT corresponding to the unique identifier is caused to be transmitted. For example, the local authentication services module can create one or more packets for transmission to the processor-based system 118, and communication circuitry, such as for communicating wirelessly by cellular network, Wi-Fi®, or the like, of the UE 122 transmits the one or more packets via the network 116 to the processor-based system 118. The request includes the unique identifier of the tagged physical good 114.

Referring to FIG. 8B, at the processor-based system 118, at block 808, the request is received, and at block 810, the NFT corresponding to the unique identifier of the request is looked-up. The processor-based system 118 can query the database 120 using the unique identifier to lookup the corresponding NFT that was minted to or stored in that database 120. The processor-based system 118 further accesses the metadata of that NFT. At block 812, a response including the metadata stored in the NFT identified by the lookup is transmitted. The processor-based system 118 can cause one or more packets that include the metadata to be transmitted via the network 116 to the UE 122.

Referring back to FIG. 8A, at the UE 122, at block 814, the response including the metadata is received. For example, the local authentication services module can receive the one or more packets transmitted by the processor-based system 118 from the communication circuitry, such as for communicating wirelessly by cellular network, Wi-Fi®, or the like, of the UE 122.

At block 816, a hashphrase is generated based on the metadata using a hash function. The hash function can have any size of data input and can output a hashphrase of a predetermined length. The local authentication services module can implement the hash function and can input the metadata or a particular field or fields of the metadata. At block 818, the hashphrase is encrypted using the private key to obtain a local ciphertext.

At block 820, a request for an authenticating ciphertext corresponding to the unique identifier is caused to be transmitted. For example, the local authentication services module can create one or more packets for transmission to the processor-based system 124, and communication circuitry, such as for communicating wirelessly by cellular network, Wi-Fi®, or the like, of the UE 122 transmits the one or more packets via the network 116 to the processor-based system 124. The request includes the unique identifier of the tagged physical good 114.

Referring to FIG. 8B, at the processor-based system 124, at block 822, the request is received, and at block 824, a request for metadata stored in an NFT corresponding to the unique identifier is caused to be transmitted. For example, the processor-based system 124 can create one or more packets for transmission to the processor-based system 118, and the processor-based system 124 transmits the one or more packets via the network 116 to the processor-based system 118. The request includes the unique identifier of the tagged physical good 114.

At the processor-based system 118, at block 808, the request is received, and at block 810, the NFT corresponding to the unique identifier of the request is looked-up. At block 812, a response including the metadata stored in the NFT identified by the lookup is transmitted. Blocks 808-812 can be performed as described previously with the response of block 812 transmitted to the processor-based system 124.

At the processor-based system 124, at block 826, the response including the metadata is received. For example, the processor-based system 124 can receive the one or more packets transmitted by the processor-based system 118 via the network 116.

At block 828, a hashphrase is generated based on the metadata using a hash function. The hash function is the same hash function as the hash function used by the local authentication services module of the UE 122.

At block 830, the private key corresponding to the unique identifier stored in the secure database is looked-up. The processor-based system 124 can query the database 126 using the unique identifier to lookup the corresponding private key stored in that database 126. At block 832, the hashphrase is encrypted using the private key to obtain the authenticating ciphertext. At block 834, a response including the authenticating ciphertext is transmitted. The processor-based system 124 can cause one or more packets that include the authenticating ciphertext to be transmitted via the network 116 to the UE 122.

Referring back to FIG. 8A, at the UE 122, at block 836, the response including the authenticating ciphertext is received. For example, the local authentication services module can receive the one or more packets transmitted by the processor-based system 124 from the communication circuitry, such as for communicating wirelessly by cellular network, Wi-Fi®, or the like, of the UE 122. At block 838, a determination whether the local ciphertext matches the authenticating ciphertext is made. If the local and authenticating ciphertexts do not match, at block 840, a response that the tagged physical good 114 is not authentic is output, and if the local and authenticating ciphertexts match, at block 842, a response that the tagged physical good 114 is authentic is output. The response can be output from the local authentication services module to an input/output device, such as a touchscreen or the like, of the UE 122 to inform the user of the UE 122 of the authenticity of the tagged physical good 114.

The method of FIGS. 8A and 8B generally uses two parallel processes of determining a ciphertext. The two parallel processes implement the same deterministic algorithm. Both use the same metadata of the same NFT that corresponds to a given unique identifier of a tagged physical good 114, and both use the same hash function to generate a hashphrase. Based on these assumptions, for a given iteration of the method, the hashphrase generated by the local authentication services module of the UE 122 and the hashphrase generated by the processor-based system 124 should be identical. Therefore, if the private keys used to generate the local ciphertext and the authenticating ciphertext are the same, the local ciphertext and the authenticating ciphertext should likewise be the same. Hence, the authenticity of the tagged physical good 114 can be determined by comparing two ciphertexts without communicating (e.g., unsecurely) the private key over the network 116.

Figure 9:
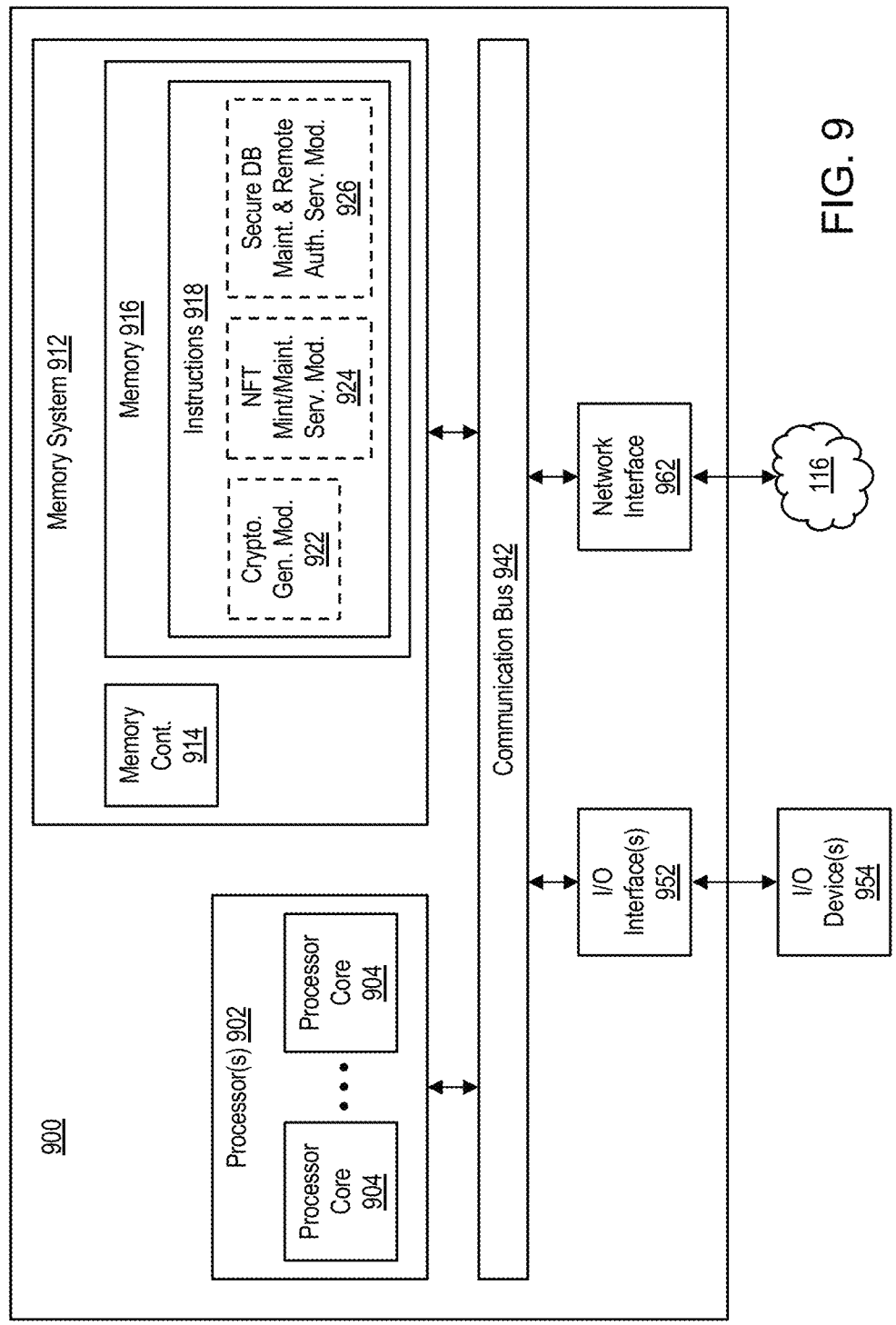
FIG. 9 is a processor-based system according to some examples.

FIG. 9 illustrates a processor-based system 900 according to some examples. The processor-based system 900 may be implemented as any of the processor-based systems 110, 118, 124. The processor-based system 900 may be a computer, a server, or other machine. The processor-based system 900 includes one or more processors 902, a memory system 912, a communication bus 942, one or more input/output (I/O) interfaces 952, and a network interface 962.

Each processor 902 can include one or more processor cores 904. Each processor 902 and/or processor core 904 may be, for example, a central processing unit (CPU), a reduced instruction set computing (RISC) processor, a complex instruction set computing (CISC) processor, a graphics processing unit (GPU), a digital signal processor (DSP), an application specific integrated circuit (ASIC), a field programmable gate array (FPGA), another processor, or any suitable combination thereof.

The memory system 912 includes one or more memory controllers 914 and memory 916. The memory controllers 914 are configured to control read and/or write access to a particular memory 916 or subset of memory 916. The memory 916 may include main memory, disk storage, or any suitable combination thereof. The memory 916 may include any type of volatile or nonvolatile memory, such as dynamic random access memory (DRAM), static random access memory (SRAM), erasable programmable read-only memory (EPROM), electrically erasable programmable read-only memory (EEPROM), Flash memory, solid-state storage, etc. The memory 916 is a non-transitory machine-readable storage medium. Instructions 918 are stored in the memory 916. The instructions 918 may be machine-executable code (e.g., machine code) and may comprise firmware, software, a program, an application, an applet, or other machine-executable code. The instructions 918 can, for example, depending on which of the processor-based systems 110, 118, 124 is being implemented, embody a software module, such as a cryptographic generation module 922, an NFT minting and maintenance services module 924, and/or a secure database maintenance and remote authentication services module 926, which when executed by the one or more processors 902. performs various functionality and methodologies as referenced above.

The one or more I/O interfaces 952 are configured to be electrically and/or communicatively coupled to one or more I/O devices 954. Example I/O devices 954 include a keyboard, a mouse, a display device, a printer, etc. The one or more I/O interfaces 952 can include connectors or coupling circuitry, such as a universal serial bus (USB) connection, a high-definition multimedia interface (HDMI) connection, Bluetooth® circuitry, or the like.

The network interface 962 is configured to be communicatively coupled to the network 116. The network interface 962 can include circuitry for wired communication, such as an Ethernet connection, and/or can include circuitry for wireless communication, such as a circuitry for Wi-Fi® communications.

The communication bus 942 is communicatively connected to the one or more processors 902, the memory system 912, the one or more I/O interfaces 952, and the network interface 962. The various components can communicate between each other via the communication bus 942. The communication bus 942 can control the flow of communications, such as by including an arbiter to arbitrate the communications.

Figure 10:
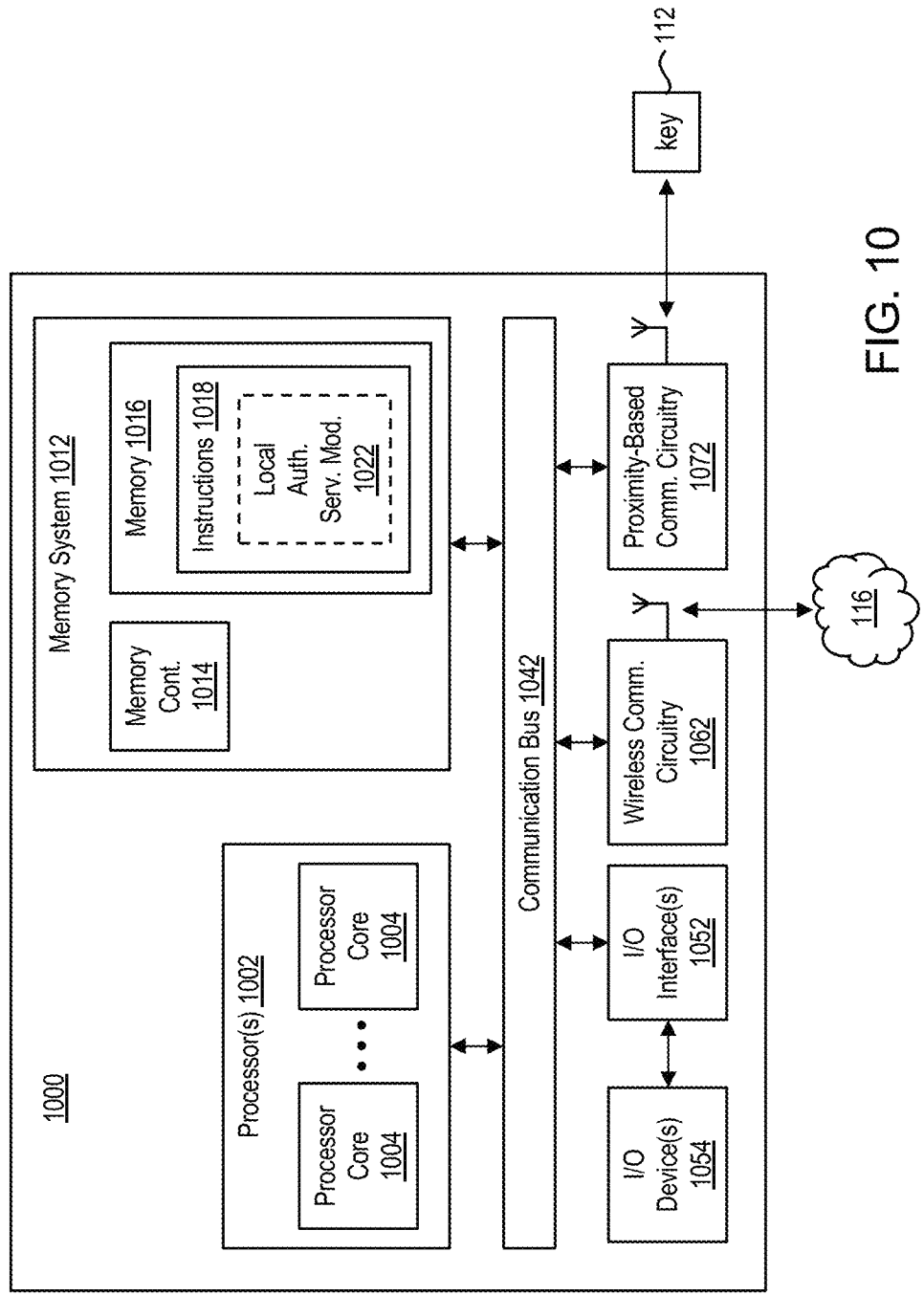
FIG. 10 is a processor-based system according to some examples.

FIG. 10 illustrates a processor-based system 1000 according to some examples. The processor-based system 1000 may be implemented as the UE 122, as an example. The processor-based system 1000 may be a computer, a mobile phone, or other machine. The processor-based system 1000 includes one or more processors 1002, a memory system 1012, a communication bus 1042, one or more I/O interfaces 1052, one or more I/O devices 1054, wireless communication circuitry 1062, and proximity-based communication circuitry 1072.

Each processor 1002 can include one or more processor cores 1004. Each processor 1002 and/or processor core 1004 may be, for example, a CPU, a RISC processor, a CISC processor, a GPU, a DSP, an ASIC, a FPGA, another processor, or any suitable combination thereof.

The memory system 1012 includes one or more memory controllers 1014 and memory 1016. The memory controllers 1014 are configured to control read and/or write access to a particular memory 1016 or subset of memory 1016. The memory 1016 may include main memory, disk storage, or any suitable combination thereof. The memory 1016 may include any type of volatile or nonvolatile memory, such as DRAM, SRAM, EPROM, EEPROM, Flash memory, solid-state storage, etc. The memory 1016 is a non-transitory machine-readable storage medium. Instructions 1018 are stored in the memory 1016. The instructions 1018 may be machine-executable code (e.g., machine code) and may comprise firmware, software, a program, an application, an applet, or other machine-executable code. The instructions 1018 can, for example, embody a software module, such as a local authentication services module 1022, which when executed by the one or more processors 1002, performs various functionality and methodologies as referenced above.

The one or more I/O interfaces 1052 are configured to be electrically and/or communicatively coupled to one or more I/O devices 1054. Example I/O devices 1054 include a touchscreen, a speaker, a microphone, sensors, haptic devices, etc.

The wireless communication circuitry 1062 is configured to be communicatively coupled to the network 116. The wireless communication circuitry 1062 can include circuitry wireless communication, such as a circuitry for Wi-Fi® communications and/or communications over a cellular telephone network.

The proximity-based communication circuitry 1072 includes circuitry for wirelessly communicating with, e.g., a passive electronic tag device using NFC, RFID communication, SmartCard communication, the like, or a combination thereof. The proximity-based communication circuitry 1072 is configured to communicate with devices that are within some predefined proximity to the processor-based system 1000, such as a proximity from within a few centimeters to a few meters.

The communication bus 1042 is communicatively connected to the one or more processors 1002, the memory system 1012, the one or more I/O interfaces 1052, the wireless communication circuitry 1062, and the proximity-based communication circuitry 1072. The various components can communicate between each other via the communication bus 1042. The communication bus 1042 can control the flow of communications, such as by including an arbiter to arbitrate the communications.

Figure 11:
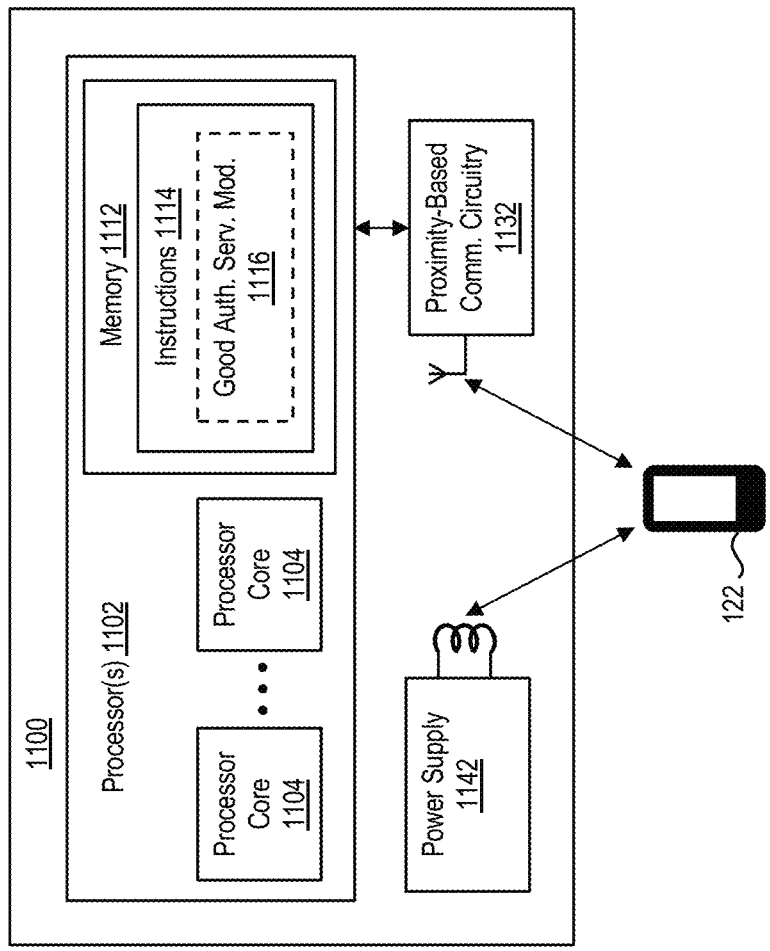
FIG. 11 is a processor-based system according to some examples.

FIG. 11 illustrates a processor-based system 1100 according to some examples. The processor-based system 1000 may be implemented as the encoded electronic tag device 112, as an example. The processor-based system 1100 may be a System-on-Chip (SoC), an electronic package comprising one or more semiconductor dies or integrated circuits, or other machine. The processor-based system 1100 includes one or more processors 1102, embedded memory 1112, proximity-based communication circuitry 1132, and an inductively coupled power supply 1142.

Each processor 1102 can include one or more processor cores 1104. Each processor 1102 and/or processor core 1104 may be, for example, a CPU, a RISC processor, a CISC processor, a DSP. an ASIC, a FPGA, another processor, or any suitable combination thereof.

The embedded memory 1112 is disposed in the one or more processors 1102. In some examples, one or more memory controllers may be included. The embedded memory 1112 may include any type of volatile or nonvolatile memory, such as DRAM, SRAM, EPROM, EEPROM, Flash memory, solid-state storage, etc. The embedded memory 1112 is a non-transitory machine-readable storage medium. Instructions 1114 are stored in the embedded memory 1112. The instructions 1114 may be machine-executable code (e.g., machine code) and may comprise firmware, software, a program, an application, an applet, or other machine-executable code. The instructions 1114 can, for example, embody a software module, such as a good authentication services module 1116, which when executed by the one or more processors 1102, performs various functionality and methodologies as referenced above.

The proximity-based communication circuitry 1132 includes circuitry for wirelessly communicating with, e.g., an electronic tag device using NFC, RFID communication, SmartCard communication, the like, or a combination thereof. The proximity-based communication circuitry 1132 is communicatively coupled with the one or more processors 1102. The proximity-based communication circuitry 1132 is configured to communicate with devices that are within some predefined proximity to the processor-based system 1100, such as a proximity from within a few centimeters to a few meters.

The inductively coupled power supply 1142 is configured to be magnetically coupled to a magnetic field and generate power for operation of the processor-based system 1100 using the magnetic field. The inductively coupled power supply 1142 is configured to convert a magnetic field to an electrical current, such as by inductive coupling, and to convert the electrical current to a voltage that is capable of powering the processor-based system 1100 to execute the good authentication services module 1116. The inductively coupled power supply 1142 may be part of a same chip as the one or more processors 1102 (e.g., as a SoC), or may be a separate integrated circuit packaged with the integrated circuit comprising the one or more processors 1102.

According to an example, a non-transitory machine-readable storage medium includes stored instructions. The store instructions, when executed by one or more processors, cause the one or more processors to: receive a unique identifier of a tagged physical good; receive a public key stored in a Non-Fungible Token (NFT) corresponding to the unique identifier; encrypt a first passphrase using the public key to obtain an encrypted passphrase; compare a second passphrase to the first passphrase; and generate an output indication in response to comparing the second passphrase to the first passphrase. The second passphrase is generated by decrypting the encrypted passphrase using a private key stored on an electronic tag device embedded in the tagged physical good.

In the above example, the stored instructions, which when executed by the one or more processors, may further cause the one or more processors to: cause a request for the second passphrase to be transmitted, and receive a response including the second passphrase. The request including the encrypted passphrase In the above example, the stored instructions, which when executed by the one or more processors, may further cause the one or more processors to: receive the private key, and decrypt the encrypted passphrase, to obtain the second passphrase, using the private key.

In the above example, the stored instructions, which when executed by the one or more processors, may further cause the one or more processors to: generate the first passphrase. Generating the first passphrase includes a randomization process.

In the above example, the stored instructions, which when executed by the one or more processors, may further cause the one or more processors to: generate the first passphrase using a hash function. At least some metadata of the NFT may be input to the hash function to generate the first passphrase.

According to another example, a physical good includes an electronic tag device and an inductive coupling power source. The electronic tag device includes one or more processors and non-transitory memory. The non-transitory memory includes stored instructions. The stored instructions, when executed by the one or more processors, cause the one or more processors to: receive a request for a decrypted passphrase, the request including an encrypted passphrase; decrypt the encrypted passphrase using a private key to obtain the decrypted passphrase, the private key being stored in the non-transitory memory; and cause a response including the decrypted passphrase to be transmitted.

In the above example, the electronic tag device may include the inductive coupling power source.

In the above example, the electronic tag device may further include Near Field Communication (NFC) circuitry. The electronic tag device may be configured to receive the request by the NFC circuitry and transmit the response by the NFC circuitry.

In the above example, the electronic tag device may further include SmartCard communication circuitry. The electronic tag device may be configured to receive the request by the SmartCard communication circuitry and transmit the response by the SmartCard communication circuitry.

Another example is a method for authentication. The method includes: by a first processor-based system, receiving a public key stored in a Non-Fungible Token (NFT) corresponding to a unique identifier of a physical good; by the first processor-based system, encrypting a first passphrase using the public key to obtain an encrypted passphrase; by a second processor-based system, decrypting the encrypted passphrase, to obtain a second passphrase, using a private key stored embedded in the physical good; by the first processor-based system, comparing the first passphrase to the second passphrase; and by the first processor-based system, generating an output indication in response to comparing the second passphrase to the first passphrase.

In the above example, the second processor-based system may be the first processor-based system.

In the above example, the second processor-based system may be a different system from the first processor-based system, and the second processor-based system may be embedded in the physical good.

In the above example, the method may further include, by the first processor-based system, generating the first passphrase using a randomization process.

In the above example, the method may further include, by the first processor-based system, generating the first passphrase using a hash function. At least some metadata of the NFT may be input to the hash function to generate the first passphrase.

In the above example, the output indication may be output on an output device communicatively coupled to the first processor-based system.

According to another example, a non-transitory machine-readable storage medium includes stored instructions. The store instructions, when executed by one or more processors, cause the one or more processors to: generate a cryptographic key for a physical good; cause a Non-Fungible Token (NFT) corresponding to a unique identifier of the physical good to be minted; and encode an electronic tag device with the cryptographic key, the electronic tag device to be embedded in the physical good.

In the above example, metadata of the NFT may include the unique identifier.

In the above example, generating the cryptographic key may include generating an asymmetric key pair for the physical good, and the asymmetric key pair may include a public key and a private key. Metadata of the NFT may include the public key. The electronic tag device may be encoded with the private key.

In the above example, the cryptographic key may be a private key of symmetric cryptography.

In the above example, the stored instructions, which when executed by the one or more processors, may further cause the one or more processors to: cause the private key to be stored in a secure database.

Another example is a method for enabling authentication. The method includes, by a processor-based system: generating a cryptographic key corresponding to a physical good; causing a Non-Fungible Token (NFT) corresponding to a unique identifier of the physical good to be minted; and encoding an electronic tag device with the cryptographic key. The electronic tag device is to be embedded in the physical good.

In the above example, metadata of the NFT may include the unique identifier.

In the above example, generating the cryptographic key may include generating an asymmetric key pair for the physical good, and the asymmetric key pair may include a public key and a private key. Metadata of the NFT may include the public key. The electronic tag device may be encoded with the private key.

In the above example, the cryptographic key may be a private key of symmetric cryptography.

In the above example, the method may further include, by the processor-based system, causing the private key to be stored in a secure database.

According to another example, a non-transitory machine-readable storage medium includes stored instructions. The store instructions, when executed by one or more processors, cause the one or more processors to: receive a private key from an electronic tag device embedded in a tagged physical good; receive metadata stored in a Non-Fungible Token (NFT) corresponding to a unique identifier of the tagged physical good; generate a first passphrase based on the metadata; encrypt the first passphrase using the private key to obtain a first encrypted passphrase; compare a second encrypted passphrase to the first encrypted passphrase; and generate an output indication in response to comparing the second encrypted passphrase to the first encrypted passphrase. The second encrypted passphrase is generated by encrypting a second passphrase with another private key remotely. The second passphrase is generated based on the metadata.

In the above example, generating the first passphrase may include inputting at least some of the metadata into a hash function to generate the first passphrase, and the first passphrase may be output from the hash function.

According to another example, a non-transitory machine-readable storage medium includes stored instructions. The store instructions, when executed by one or more processors, cause the one or more processors to: receive a private key from a secure database; receive metadata stored in a Non-Fungible Token (NFT) corresponding to the unique identifier; generate a first passphrase based on the metadata; encrypt the first passphrase using the private key to obtain a first encrypted passphrase; and cause the first encrypted passphrase to be transmitted to another system. The private key corresponds to a unique identifier of a tagged physical good. At the other system, the first encrypted passphrase is compared to a second encrypted passphrase. The second encrypted passphrase is generated by encrypting a second passphrase with another private key stored in an electronic tag device embedded in the tagged physical good. The second passphrase is generated based on the metadata.

In the above example, generating the first passphrase may include inputting at least some of the metadata into a hash function to generate the first passphrase, and the first passphrase may be output from the hash function.

Another example is a method for authentication. The method includes: by a first processor-based system, receiving metadata stored in a Non-Fungible Token (NFT) corresponding to a unique identifier of a physical good; by the first processor-based system, generating a first passphrase based on the metadata; by the first processor-based system, encrypting the first passphrase, to obtain a first encrypted passphrase, using a local private key stored on an electronic tag device embedded in the physical good; by a second processor-based system remote from the first processor-based system, receiving the metadata stored in the NFT; by the second processor-based system, generating a second passphrase based on the metadata; by the second processor-based system, encrypting the second passphrase, to obtain a second encrypted passphrase, using a remote private key stored in a database remote from the physical good; by the first processor-based system, comparing the first encrypted passphrase to the second encrypted passphrase; and by the first processor-based system, generating an output indication in response to comparing the first encrypted passphrase to the second encrypted passphrase.

In the above example, generating the first passphrase may include inputting at least some of the metadata into a first hash function to generate the first passphrase, and generating the second passphrase may include inputting at least some of the metadata into a second hash function to generate the second passphrase. The first passphrase may be output from the first hash function, and the second passphrase may be output from the second hash function. The second hash function may be a same hash function as the first hash function.

Although the present examples and advantages have been disclosed, it should be understood that various changes, substitutions, permutations, and alterations can be made without departing from the scope of the subject matter claimed herein. It will be appreciated that any feature that is described in a connection to any one embodiment may also be applicable to any other embodiment.

What is claimed:

1. A non-transitory machine-readable storage medium comprising stored instructions, which when executed by one or more processors, cause the one or more processors to:
receive a unique identifier of a tagged physical good;
receive a public key stored in a Non-Fungible Token (NFT) corresponding to the unique identifier;
encrypt a first passphrase using the public key to obtain an encrypted passphrase;
compare a second passphrase to the first passphrase, the second passphrase being generated by decrypting the encrypted passphrase using a private key stored on an electronic tag device embedded in the tagged physical good; and
generate an output indication in response to comparing the second passphrase to the first passphrase.

2. The non-transitory machine-readable storage medium of claim 1, wherein the stored instructions, which when executed by the one or more processors, further cause the one or more processors to:
cause a request for the second passphrase to be transmitted, the request including the encrypted passphrase; and
receive a response including the second passphrase.

3. The non-transitory machine-readable storage medium of claim 1, wherein the stored instructions, which when executed by the one or more processors, further cause the one or more processors to:
receive the private key; and
decrypt the encrypted passphrase, to obtain the second passphrase, using the private key.

4. The non-transitory machine-readable storage medium of claim 1, wherein the stored instructions, which when executed by the one or more processors, further cause the one or more processors to:
generate the first passphrase, generating the first passphrase including a randomization process.

5. The non-transitory machine-readable storage medium of claim 1, wherein the stored instructions, which when executed by the one or more processors, further cause the one or more processors to:
generate the first passphrase using a hash function, at least some metadata of the NFT being input to the hash function to generate the first passphrase.

6. A physical good comprising:
an electronic tag device comprising:
one or more processors; and
non-transitory memory comprising stored instructions, which when executed by the one or more processors, cause the one or more processors to:
receive a request for a decrypted passphrase, the request including an encrypted passphrase;
decrypt the encrypted passphrase using a private key to obtain the decrypted passphrase, the private key being stored in the non-transitory memory; and
cause a response including the decrypted passphrase to be transmitted; and
an inductive coupling power source.

7. The physical good of claim 6, wherein the electronic tag device includes the inductive coupling power source.

8. The physical good of claim 6, wherein the electronic tag device further comprises Near Field Communication (NFC) circuitry, the electronic tag device being configured to receive the request by the NFC circuitry and transmit the response by the NFC circuitry.

9. The physical good of claim 6, wherein the electronic tag device further comprises SmartCard communication circuitry, the electronic tag device being configured to receive the request by the SmartCard communication circuitry and transmit the response by the SmartCard communication circuitry.

10. A method for authentication, the method comprising:
by a first processor-based system, receiving a public key stored in a Non-Fungible Token (NFT) corresponding to a unique identifier of a physical good;
by the first processor-based system, encrypting a first passphrase using the public key to obtain an encrypted passphrase;
by a second processor-based system, decrypting the encrypted passphrase, to obtain a second passphrase, using a private key stored embedded in the physical good;
by the first processor-based system, comparing the first passphrase to the second passphrase; and
by the first processor-based system, generating an output indication in response to comparing the second passphrase to the first passphrase.

11. The method of claim 10, wherein the second processor-based system is the first processor-based system.

12. The method of claim 10, wherein the second processor-based system is a different system from the first processor-based system, the second processor-based system being embedded in the physical good.

13. The method of claim 10 further comprising, by the first processor-based system, generating the first passphrase using a randomization process.

14. The method of claim 10 further comprising, by the first processor-based system, generating the first passphrase using a hash function, at least some metadata of the NFT being input to the hash function to generate the first passphrase.

15. The method of claim 10, wherein the output indication is output on an output device communicatively coupled to the first processor-based system.

16. A non-transitory machine-readable storage medium comprising stored instructions, which when executed by one or more processors, cause the one or more processors to:
generate a cryptographic key for a physical good, wherein generating the cryptographic key includes generating an asymmetric key pair for the physical good, the asymmetric key pair comprising a public key and a private key;
cause a Non-Fungible Token (NFT) corresponding to a unique identifier of the physical good to be minted, wherein metadata of the NFT includes the public key; and
encode an electronic tag device with the cryptographic key, the electronic tag device to be embedded in the physical good, wherein the electronic tag device is encoded with the private key.

17. The non-transitory machine-readable storage medium of claim 16, wherein metadata of the NFT includes the unique identifier.

18. The non-transitory machine-readable storage medium of claim 16, wherein the stored instructions, which when executed by the one or more processors, further cause the one or more processors to:
cause the private key to be stored in a secure database.

* * * * *